(12) United States Patent
Diehl (10) Patent No.: US 10,456,709 B2
(45) Date of Patent: Oct. 29, 2019

(54) DISPERSION FLOW DEVICE FOR EXTRACTION VESSEL AND METHODS OF USE

(71) Applicant: Green Mill Systems, LLC, Pittsburgh, PA (US)

(72) Inventor: Jeremy Diehl, Pittsburgh, PA (US)

(73) Assignee: GREEN MILL SUPERCRITICAL, INC., Pittsburgh, PA (US)

( * ) Notice: Subject to any disclaimer, the term of this patent is extended or adjusted under 35 U.S.C. 154(b) by 15 days.

(21) Appl. No.: 15/592,111

(22) Filed: May 10, 2017

(65) Prior Publication Data

US 2017/0326473 A1 Nov. 16, 2017

Related U.S. Application Data

(60) Provisional application No. 62/334,033, filed on May 10, 2016.

(51) Int. Cl.

| | | |
|---|---|---|
| *B01D 11/04* | (2006.01) | |
| *B01D 11/02* | (2006.01) | |
| *A23F 5/24* | (2006.01) | |
| *D06F 43/00* | (2006.01) | |

(52) U.S. Cl.
CPC ............ *B01D 11/0403* (2013.01); *A23F 5/24* (2013.01); *B01D 11/0203* (2013.01); *D06F 43/00* (2013.01); *D06F 43/007* (2013.01)

(58) Field of Classification Search
None
See application file for complete search history.

(56) References Cited

U.S. PATENT DOCUMENTS

| | | |
|---|---|---|
| 6,403,126 B1 | 6/2002 | Webster et al. |
| 7,204,437 B2 | 4/2007 | Eno |
| 7,259,231 B2 | 8/2007 | Cornish et al. |
| 7,299,745 B2 | 11/2007 | Nelson |
| 7,709,536 B2 | 5/2010 | Whittle |
| 8,114,190 B2 | 2/2012 | Komatsu |
| 8,211,946 B2 | 7/2012 | Whittle |
| 8,603,515 B2 | 12/2013 | Whittle |
| 8,745,961 B2 | 6/2014 | Terzini |
| 8,815,305 B2 | 8/2014 | Henry et al. |
| 8,895,078 B2 | 11/2014 | Mueller |
| 9,044,390 B1 | 6/2015 | Speier |
| 9,095,555 B2 | 8/2015 | Winnicki |
| 9,132,363 B2 | 9/2015 | Joseph |
| 9,186,386 B2 | 11/2015 | Speier |

(Continued)

OTHER PUBLICATIONS

"Full Spectrum Extraction," obtained Mar. 23, 2018, Vitalis Extraction Tech, https://vitaliset.com/full-spectrum-extraction/, entire document, 7 pages.

*Primary Examiner* — Eric W Golightly
(74) *Attorney, Agent, or Firm* — Pepper Hamilton LLP (57) ABSTRACT

An extraction system and method of extraction are described herein. The extraction system generally includes an extraction vessel including a vessel body, an extraction solvent inlet, a material inlet, and an outlet, a collection vessel operably connected to the outlet, a dispersion devise disposed proximate the extraction solvent inlet and including a first surface and a second surface, a plurality of openings formed in the dispersion device and extending from the first surface to the second surface, whereby the plurality of openings are adapted for the flow of an extraction solvent therethough.

7 Claims, 6 Drawing Sheets

(56) References Cited

U.S. PATENT DOCUMENTS

| | | |
|---|---|---|
| 9,302,230 B2 | 4/2016 | Soukup |
| 9,502,237 B2 | 11/2016 | Yamaguchi |
| 9,508,546 B2 | 11/2016 | Toyoda |
| 9,649,349 B1 | 5/2017 | Tucker et al. |
| 9,669,328 B2 | 6/2017 | Jones |
| 9,744,200 B1 | 8/2017 | Tucker et al. |
| 9,895,404 B1 | 2/2018 | Baskis |
| 9,980,996 B2 | 5/2018 | Speier |
| 10,092,611 B1 | 10/2018 | Speier |

FIG. 1

Bottom View of Device

FIG. 2

Side View of Device

CO2 Rotating Dispersion Device

DISPERSION FLOW DEVICE FOR EXTRACTION VESSEL AND METHODS OF USE

CROSS-REFERENCE TO RELATED APPLICATIONS

This application claims the benefit of U.S. Provisional Patent Application Ser. No. 62/334,033, filed May 10, 2016, entitled "$CO_2$ Dispersion Flow Device for Supercritical Extraction Vessel."

FIELD

Embodiments of the present invention generally relate to extraction systems and methods and more particularly to dispersion devices used in extraction vessels.

BACKGROUND

As reflected in the patent literature, Supercritical fluid extraction (SFE) is the process of separating one component (the extractant) from another (the matrix) using a supercritical fluid. A supercritical fluid is a substance that is at a temperature and pressure above its critical point where distinct liquid and gas phases do not exist. $CO_2$ is an example of a supercritical fluid. SFE is applied broadly in the food, pharmaceutical, and fine chemical industries.

However, channeling is a common and well-known phenomenon in a SFE $CO_2$ process. Channeling happens when $CO_2$ flows through the center of an extraction vessel but is stagnant in other areas. In stagnant areas, $CO_2$ fails to move extractants out of the extraction vessel and into the collection vessel. This reduces efficiency and lowers extraction yields.

Therefore, a need exists for an extraction vessel that can solve the channeling issue, providing for improved extractant yield.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Extraction methods and systems are described herein. The present application provides new and improved dispersion devices to be used in extraction vessels and extraction methods employing such dispersion devices. Embodiment described herein address channeling by using a mountable dispersion device to disperse an extraction solvent throughout the entirety of the extraction vessel. It is contemplated that the dispersion devices described herein may be integral to an extraction vessel at the time of manufacture or may be retro-fitted for use with existing extraction vessels.

The extraction methods generally include contacting a material having extractable components (i.e., extractant) with an extraction solvent within an extraction vessel at extraction conditions sufficient to form an extraction product including an extract and a matrix, which are subsequently separated via a pressure differential. The extraction solvent passes through a dispersion device disposed within the extraction vessel prior to, or simultaneously with contact with the material.

In one or more embodiments, the extraction solvent includes a solvent suitable as a substitute for an organic solvent. For example, the extraction solvent may include carbon dioxide ($CO_2$) and/or water. In one or more specific embodiments, the extraction solvent includes $CO_2$. It is contemplated that the extraction solvent may further include a co-solvent. The co-solvent may include an alkyl alcohol, such as methanol or ethanol, for example.

In one or more embodiments, the extraction conditions include supercritical extraction conditions. As used herein, the term "supercritical" refers to a substance at a temperature and pressure above its critical point, where distinct liquid and gas phases do not exist. Thus, the supercritical extraction conditions include those above the critical point of the extraction solvent. In such an embodiment wherein the extraction solvent includes carbon dioxide, the supercritical extraction conditions include a temperature greater than 31° C. and a pressure greater than 74 bar, for example.

In one or more embodiments the extraction solvent is $CO_2$ and the temperature is in a range of from about 31° C. to about 200° C., or from about 50° C. to about 140° C., or from about 80° C. to about 120° C., for example.

In one or more embodiments, the supercritical extraction conditions include a pressure in a range of from about 900 psi to 20,000 psi, or from about 950 psi to 20000 psi, or from about 1,000 psi to about 19,500 psi, for example.

In one or more embodiments, the supercritical extraction conditions include a temperature in a range of from about −78° C. to about 200° C., or from about −50° C. to about 150° C., or from about −10° C. to about 100° C., for example.

In one or more embodiments, the extraction conditions include subcritical extraction conditions. As used herein, the term "subcritical" refers to a substance at a temperature and pressure below its critical point, where fluid is distinct liquid. Thus, the subcritical extraction conditions include those below the critical point of the extraction solvent. In such an embodiment wherein the extraction solvent includes carbon dioxide, the subcritical conditions include a temperature of less than 31° C. and a pressure less than 74 bar, for example.

In one or more embodiments the extraction solvent is $CO_2$ and the temperature is in a range of from about −78° C. to about 31° C. or from about −50° C. to about 10° C., or from about −10° C. to about 0° C., for example.

In one or more embodiments, the extraction conditions include first conditions and second conditions. The first conditions may include subcritical extraction conditions and the second conditions may include supercritical conditions, for example.

The material to be extracted may include a botanical material (e.g., plant, algae, cyanobacteria), a synthetic material (e.g., polymers, oils), a natural material (e.g., rocks, sand) or combinations thereof, for example. Non limiting examples of materials to be extracted include plants and trees (e.g., cassia, cinnamon, sassafras, wood, camphor, cedar, rosewood, sandalwood, agarwood, rhizome, galangal, ginger, basil, bay leaf, buchu, cannabis, sage, eucalyptus, guava, lemon grass, melaleuca, oregano, patchouli, peppermint, pine, rosemary, spearmint, tea tree, thyme, tsuga, wintergreen, resin, benzoin, copaiba, frankincense, myrrh, marjoram, orange, rose, ylang-ylang), peels (e.g., bergamot, grapefruit, lemon, lime, orange, mango, tangerine), root and balerian; berries (e.g., allspice and juniper), seeds (e.g., anise, buchu, celery, cumin, nutmeg, truffles), perfumes and fragrances (e.g., orchard, honeysuckle, chrysanthemum, bloom, hibiscus, azaleas, roses, lotus, tonka bean, carrot seed, coriander, caraway, cocoa, nutmeg, mace, cardamom, and anise, iris rhizomes, vetiver roots, various rhizomes of the ginger, labdanum, frankincense/olibanum, myrrh, Balsam of Peru, gum benzoin, osmanthus, plumeria, mimosa, tuberose, narcissus), tobacco, stains from clothing (dry cleaning), caffeine from coffee or combinations thereof, for example.

The extraction vessel may be contained within an extraction system. The extraction system may include one or more extraction vessels. The extraction system may further include one or more collection vessels in operable communication with the one or more extraction vessels.

It is further contemplated and known to ones skilled in the art that the extraction system may include heating elements, automated backpressure regulators and other systems and equipment for control thereof.

The extraction vessel is generally formed of a vessel body with one or more inlets and one or more outlets formed therethrough. The design and number of such vessels, including the design and number of inlets and outlets, is known to ones skilled in the art and thus is not described in detail herein.

In addition, the extraction vessel generally includes a dispersion device. The dispersion device may be formed of a material that does not react with the extractant, the matrix or the extraction solvent. For example, the dispersion device may be formed of ceramic or metal, including metal alloys. Specific examples of the metal and or metal alloys include, but are not limited to, zinc, iron, steel, copper, aluminum, and stainless steel.

The dispersion device generally includes a plurality of apertures adapted for the flow of extraction solvent therethrough. In contrast to previous dispersion devices, the apertures are formed such as to minimize channeling and ensure the extraction solvent flows throughout the entirety of the extraction vessel. Thus, each aperture is formed in the dispersion plate such that a diameter of the aperture formed in a first surface of the dispersion device, which may be a top surface or a peripheral surface (i.e., a first diameter) is different than that of the diameter of the aperture formed in a second surface of the dispersion device, which may be a bottom surface or a interior surface (i.e., a second diameter). The diameter (e.g., the first diameter and/or the second diameter) of each aperture could be the same or varied. For example, the diameter (e.g., the first or second diameter) of each aperture may be in a range of 0.001 mm to 5 mm, or 1 mm to 4 mm, or 2 mm to 3 mm. However, as stated previously herein, the first diameter and the second diameter are different. In one or more embodiments, the first diameter is greater than the second diameter. In one or more embodiments, the first diameter is great than the second diameter. For example, the first diameter may be 5%, or 8% or 10% greater than the second diameter.

In one or more embodiments, the apertures include smaller apertures and larger apertures, for example. The smaller apertures can vary in circumference from about 0.5 mm to about 50 mm, or from 0.7 mm to about 45 mm or from about 2 mm to about 5 mm, for example. The larger apertures can vary in circumference from about 5 mm to about 50 mm or from about 8 mm to about 20 mm, or from about 9 mm to about 15 mm, for example.

The plurality of apertures could be randomly or concentrically placed throughout the dispersion device. In addition, the sidewalls of the apertures could be perpendicular to a surface of the dispersion device or they could be inclined at an angle relative to a surface of the dispersion device to create greater turbulence (i.e., angle of incline). For example, an angle of incline of each of the apertures may be in a range of from about 10 degrees to about 80 degrees, or from about 15 degrees to about 75 degrees, or from about 20 degrees to about 70 degrees, for example.

In one or more embodiments, the turbulence of the extraction vessel is increased compared to an identical vessel absent the dispersion device. For example, the turbulence may be increased by about 10%, or about 20% or about 30% compared to an identical device absent the dispersion device. Further, the turbulence of the extraction device having inclined apertures as in one or more embodiments described herein, may have a turbulence that is increased by about 5%, or about 8%, or about 10% compared to an identical dispersion device having apertures perpendicular to a surface of the dispersion device.

In one or more embodiments, the dispersion device is in the form of a plate. The plate may be disposed within the extraction vessel such that the extraction solvent is thoroughly dispersed throughout the extraction vessel. For example, in one or more embodiments, the dispersion device is disposed near an outlet of the extraction vessel. In alternative embodiments, the dispersion device is disposed near an inlet of the extraction vessel. In yet additional embodiments, the dispersion device is disposed essentially equidistant between an inlet and an outlet. In one or more specific embodiments, the dispersion device is disposed within proximity of an extraction solvent inlet such that the extraction solvent flows through the dispersion device prior to contact with the material.

The plate is generally of a circular shape. In one or more embodiments, the dispersion plate generally includes an outer edge defining a shape of a flat disk having a shape and diameter consistent with that of the extraction vessel. The plate further includes the plurality of apertures formed in a top surface and extending through the dispersion plate to a bottom surface. The bottom surface is disposed facing or proximate to the one or more outlets and the top surface is disposed facing or proximate to the extraction solvent inlet.

In one or more embodiments, a portion of the aperture formed in the top surface includes the first diameter and the portion of the aperture formed in the bottom surface includes the second diameter. In alternative embodiments, the portion of the aperture formed in top surface includes the second diameter and the portion of the aperture formed in the bottom surface includes the first diameter.

The plate may have a thickness in a range of from 1/32 of an inch to 5 inches, or from 1/16 of an inch to 3.5 inches, or from 1/16 of an inch to 3/4 of an inch, for example.

In one or more embodiments, the dispersion device includes a rotating dispersion device. The rotating dispersion device generally includes a rotational shaft having a vertical axis, a dispersion arm that is attached to and rotated by the shaft and a driving motor for rotating the rotational shaft. The dispersion arm has a series of apertures located in a tapered slit that start close to the point that the dispersion arm.

In one or more embodiments, the apertures have a diameter that is smaller near the point the dispersion arm attaches to the rotational shaft (e.g., similar to the second diameter discussed previously herein) and get larger toward the end of the dispersion arm (e.g., the first diameter). This design causes the extraction solvent to spread out more evenly across the vessel. The tapered slit could be at an angle with respect to a top surface, creating even more turbulence and more even flow of the extraction solvent. This dispersion device acts as a rotating sprayer to cause the extraction solvent flow to spread as the extraction solvent enters the extraction vessel. The dispersion device slows extraction solvent flow in the center and encourages the extraction solvent to flow throughout the entire vessel, thus reducing channeling in the center of the vessel.

Alternatively, the rotating dispersion device may include a rotational shaft having a vertical axis, a plate dispersion device and a driving motor for rotating the rotational shaft and the plate dispersion device. The plate dispersion device may be rotated by the rotational shaft.

Figure 1:
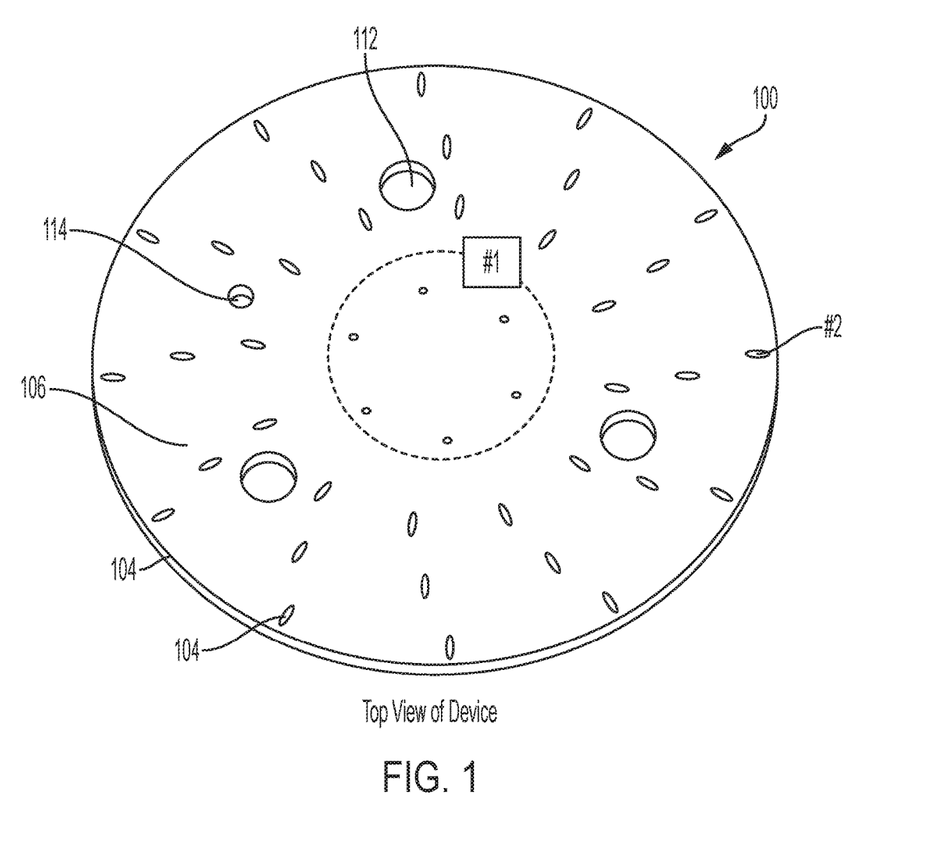
FIG. 1 illustrates a top view of an embodiment of a dispersion device.

FIG. 1 illustrates an embodiment of the dispersion device 100. The dispersion device 100 generally is formed of a mountable circular plate having a top surface 106. The circular plate generally has apertures 104 disposed throughout. The apertures 104 generally have an angle of include relative to the top surface 106 of about 20 degrees. The dispersion device includes apertures 104 of varying diameters (see aperture type #1 versus aperture type #2). In the specific embodiment illustrated in FIG. 1, the smaller apertures #1 are disposed toward the center of the dispersion vessel 102 to prevent the extraction solvent from channeling in the center of an extraction vessel (not shown).

Further illustrated in FIG. 1, the dispersion device 100 generally has openings 112 formed therethrough adapted to secure the dispersion device to the extraction vessel (not shown). The dispersion device 100 further includes an opening 114 adapted for receipt of a temperature probe (not shown).

Figure 2:
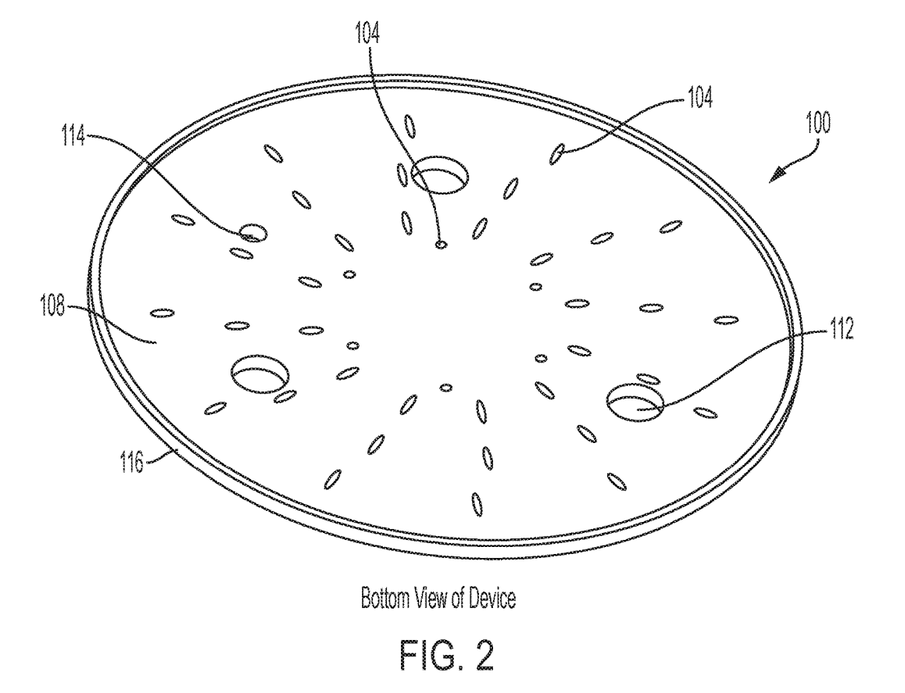
FIG. 2 illustrates a bottom view of an embodiment of a dispersion device.
Figure 3:
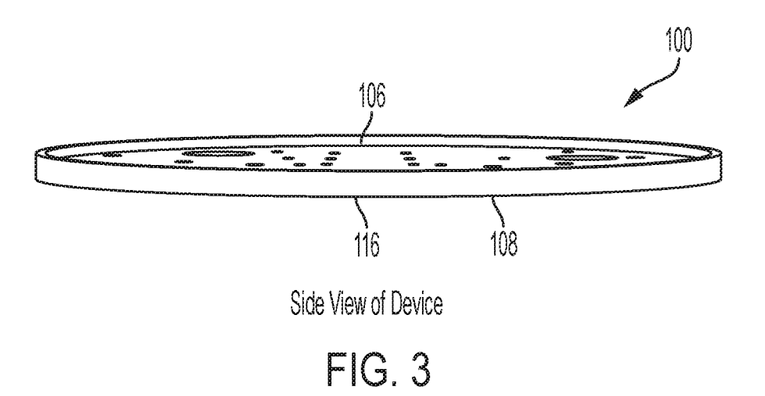
FIG. 3 illustrates a side view of an embodiment of a dispersion device.

The bottom surface 108 of the dispersion device 100 and the outer edge 116 of the dispersion device 100 are illustrated in FIGS. 2 and 3, respectively.

Figure 4:
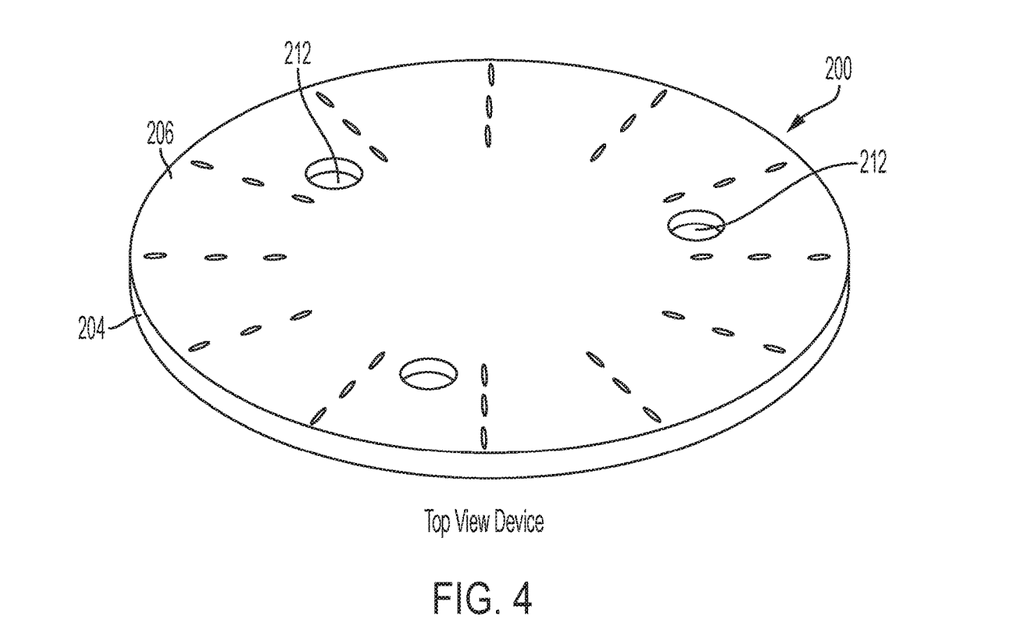
FIG. 4 illustrates a top view of an alternative embodiment of a dispersion device.

FIG. 4 shows another embodiment of a dispersion device. FIG. 4 illustrates an embodiment of the dispersion device 200 wherein apertures 204 are distributed throughout the dispersion device essentially equidistant from one another around a circumference of the device 200. The dispersion device 200 generally is formed of a mountable circular plate having a top surface 206.

Further illustrated in FIG. 4, the dispersion device 200 generally has openings 212 formed therethrough adapted to secure the dispersion device to the extraction vessel (not shown).

Figure 5:
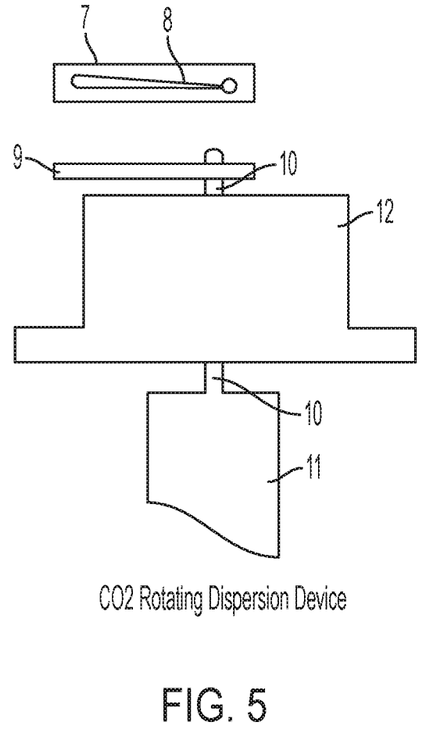
FIG. 5 illustrates a perspective view of an embodiment of a dispersion device 300.

FIG. 5 illustrates another embodiment of the present application, a rotating dispersion device 12 for producing a $CO_2$ discharge flow throughout an extraction vessel (not shown). The rotating dispersion device 12 rotation could be self-propelled by the active flow of $CO_2$ or could be rotated by motor mechanism 11 that is located underneath the rotating dispersion device 12. The rotating dispersion device 12 contains a rotational shaft 10 having a vertical axis, dispersion arms 7 and 9, and a driving motor 11 for rotating the rotational shaft 12. The dispersion arms 7 and 9, rotated by the rotational shaft 112, contains a tapered slit 8 that forces the $CO_2$ out at an angle that is inclined relative to a surface of the plate as the $CO_2$ moves up through a series of apertures (not shown) formed therein. Apertures are located in the tapered slit 8 and are smaller near the vertical axis and get larger as the apertures are located further down the arm 7. The rotating dispersion device 12 actively ensures that every part of the extraction vessel receives $CO_2$ flow. The length of the dispersion arm 7 and 9, could be slightly smaller than the radius of the vessel.

Figure 6:
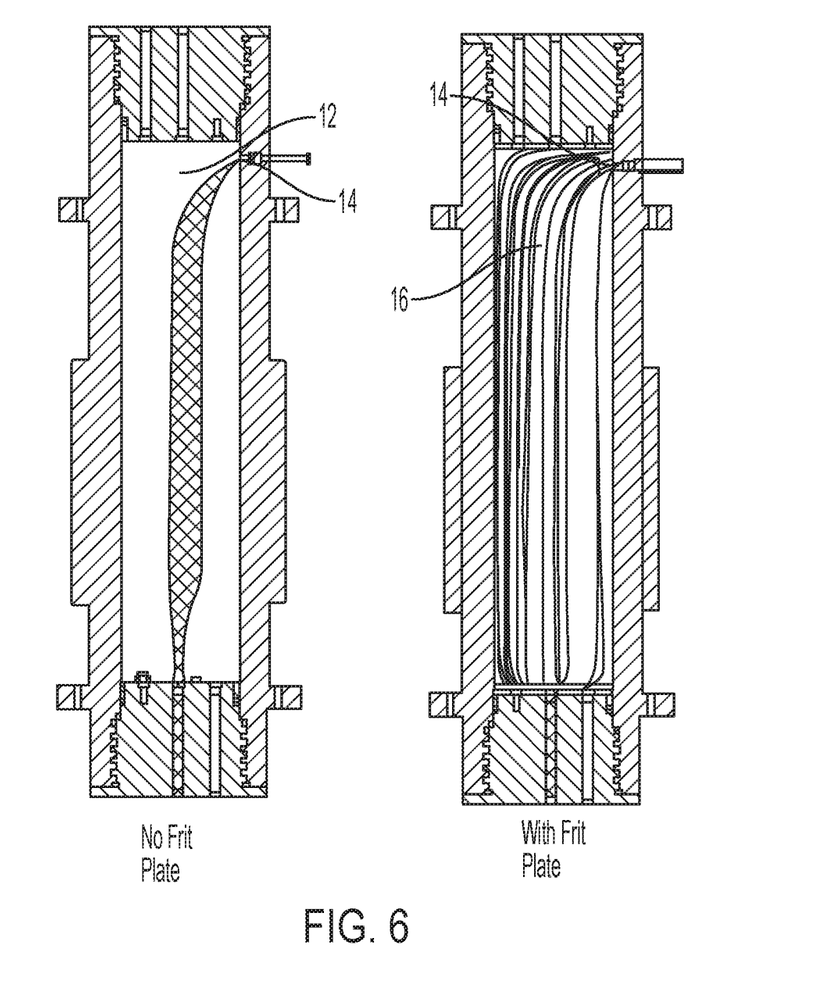
FIG. 6 illustrates a side-by-side comparison of $CO_2$ flow in extraction vessels with and without a dispersion device.

FIG. 6 illustrates a side-by-side comparison of $CO_2$ flow in extraction vessels with (12) and without (16) a dispersion device (not shown). The illustration on the right shows an extraction vessel 16 having a dispersion device (not shown) proximate to an inlet 114 in the extraction vessel. As illustrated, the extraction vessel 16 has significantly improved dispersion of the extraction solvent than that shown in extraction vessel 12 without the dispersion vessel.

While the foregoing is directed to embodiments of the present invention, other and further embodiments of the invention may be devised without departing from the basic scope thereof and the scope thereof is determined by the claims that follow.

What is claimed is:

1. An extraction system comprising:
   an extraction vessel comprising a vessel body, an extraction solvent inlet, a material inlet, an outlet, and a dispersion device;
   a collection vessel operably connected to the outlet;
   wherein the dispersion device is located within the extraction vessel and is disposed proximate the extraction solvent inlet, the dispersion device comprising a first surface and a second surface; and
   a plurality of openings formed in the dispersion device and extending from the first surface to the second surface, whereby the plurality of openings are adapted for the flow of an extraction solvent therethrough.

2. The extraction system of claim 1, wherein the dispersion device comprises a plate and wherein the plate comprises an outer edge defining a shape of a flat disk having a shape and diameter consistent with that of the extraction vessel.

3. The extraction system of claim 1, wherein the apertures comprise a first diameter disposed proximate to the first surface and a second diameter disposed proximate to the second surface and the first diameter and the second diameter are different.

4. The extraction system of claim 3, wherein the first diameter is greater than the second diameter.

5. The extraction system of claim 4, wherein an inclination angle of each of the apertures is in a range of from about 10 to about 80 degrees.

6. An extraction system comprising:
an extraction vessel comprising a vessel body, an extraction solvent inlet, a material inlet, and an outlet;
a collection vessel operably connected to the outlet;
a dispersion device disposed proximate the extraction solvent inlet and comprising a first surface and a second surface;
a plurality of openings formed in the dispersion device and extending from the first surface to the second surface, whereby the plurality of openings are adapted for the flow of an extraction solvent therethrough; and
a rotational shaft disposed within the extraction vessel, the rotational shaft comprising:
a vertical axis;
a dispersion arm that is attached to and rotated by the shaft; and
a driving motor for rotating the rotational shaft, wherein the dispersion arm comprises the dispersion device.

7. The extraction system of claim 6, wherein the dispersion arm comprises a tapered slit and whereby the plurality of apertures are disposed within the tapered slit.

* * * * *